United States Patent

Matsuhisa et al.

[11] Patent Number: 5,954,990
[45] Date of Patent: Sep. 21, 1999

[54] SOLVENT COMPOSITION AND WATER-REPELLENT/OIL-REPELLENT COMPOSITION USING THE SAME

[75] Inventors: Hirohide Matsuhisa, Yokohama; Satoko Midorikawa, Machida; Sumire Mima, Tokyo, all of Japan

[73] Assignee: Canon Kabushiki Kaisha, Tokyo, Japan

[21] Appl. No.: 08/842,031

[22] Filed: Apr. 23, 1997

Related U.S. Application Data

[62] Division of application No. 08/487,673, Jun. 7, 1995, abandoned, which is a continuation of application No. 08/371,213, Jan. 11, 1995, Pat. No. 5,458,692, which is a division of application No. 07/956,076, Oct. 2, 1992, Pat. No. 5,403,514.

[30] Foreign Application Priority Data

Oct. 7, 1991 [JP] Japan .................................. 3-285424

[51] Int. Cl.$^6$ .................... D06M 15/277; D06M 15/353; C09K 3/18
[52] U.S. Cl. .......................... 252/8.62; 252/602; 252/364; 106/2; 106/18.11; 106/18.35; 526/245
[58] Field of Search ...................... 526/245, 246, 526/247, 242; 252/364, 8.62, 602; 134/40; 106/15.05, 18.35, 18.11, 2

[56] References Cited

U.S. PATENT DOCUMENTS

| | | | |
|---|---|---|---|
| 4,024,192 | 5/1977 | Benninger et al. | 252/364 |
| 4,092,257 | 5/1978 | Fozzard | 252/66 |
| 4,605,786 | 8/1986 | Yokoyama et al. | 568/669 |
| 4,654,081 | 3/1987 | Dalzell | 106/23 |
| 4,909,806 | 3/1990 | Garbe . | |
| 5,156,780 | 10/1992 | Kenigsberg et al. . | |
| 5,164,252 | 11/1992 | Henning et al. . | |
| 5,336,740 | 8/1994 | Eian . | |
| 5,393,852 | 2/1995 | Ishibe et al. . | |
| 5,397,669 | 3/1995 | Rao . | |

*Primary Examiner*—Joseph D. Anthony
*Attorney, Agent, or Firm*—Fitzpatrick, Cella, Harper & Scinto

[57] ABSTRACT

A non-flammable water-repellent/oil repellent composition containing a fluorine containing-polymer and a solvent containing at least 40% by weight of a non-flammable perfluoro organic compound.

7 Claims, No Drawings

SOLVENT COMPOSITION AND WATER-REPELLENT/OIL-REPELLENT COMPOSITION USING THE SAME

This application is a division, of application Ser. No. 08/487,673 filed Jun. 7, 1995, now abandoned; which, in turn, is a continuation of application Ser. No. 08/371,213, filed Jan. 11, 1995, now U.S. Pat. No. 5,458,692; which is a division of application Ser. No. 07/956,076, filed Oct. 2, 1992, now U.S. Pat. No. 5,403,514.

BACKGROUND OF THE INVENTION

1. Field of the Invention

The present invention relates to a novel nonflammable solvent composition having excellent characteristics as a solvent which can take the place of 1,1,2-trichloro-1,2,2-trifluoroethane (hereinafter abbreviated to "CFC-113"), and furthermore, it relates to a fluorine-based water-repellent/oil-repellent composition using the above-mentioned solvent composition and having water-repellent/oil-repellent properties, lubricating properties, mold release properties and the like.

2. Related Background Art

Most of chlorofluorocarbons (hereinafter abbreviated to "CFCs") are less toxic, incombustible and chemically stable, and various kinds of CFCs having different boiling points are available and therefore they have been utilized in many industrial fields. Above all, CFC-113 has been used as a degreasing solvent, a dispersant and a diluting solvent for a plastic material, a part of rubber materials and various composite materials by the utilization of its specific chemical characteristics.

In recent years, ozone holes which are due to unusual changes of earth environment have been discovered, and it has been elucidated that its main cause is organic chlorine-based compounds. Particularly chemically stable CFC-113 has a long life in the troposphere, and it diffuses and reaches the stratosphere. In the stratosphere, CFC-113 gives rise to photolysis under the influence of sunbeams to generate chlorine radicals. The thus generated chlorine radicals combine with ozone, so that an ozone layer is broken. Accordingly, the use of the organic chlorine-based compounds inclusive of the CFCs will be globally restricted and forbidden in the future. Among others, CFC-113 has a high ozone destruction coefficient, and hence its prompt replacement is desired and a severe schedule of reducing the employment of CFC-113 is justified.

SUMMARY OF THE INVENTION

An object of the present invention is to provide a novel solvent composition replaceable with CFC-113 which has been heretofore used in such circumstances.

Another object of the present invention is to provide a solvent composition suitable as a degreasing solvent for various substrates.

Still another object of the present invention is to provide a water-repellent/oil-repellent composition suitable as a modifier for the surfaces of various substrates.

The present invention for achieving the above-mentioned objects is directed to a nonflammable solvent composition containing 40% by volume or more of non-flammable perfluoro organic compound, and a nonflammable water-repellent/oil-repellent composition containing a fluorine-containing polymer and a solvent containing 40% by weight or more of a non-flammable perfluoro organic compound.

DESCRIPTION OF THE PREFERRED EMBODIMENTS

The reasons why CFC-113 has often been used as a degreasing solvent are (a) that it has a suitable solubility to various soils and oils,
(b) that it is excellent in chemical stability, and there is no worry of decomposition and the like,
(c) that it is less toxic and has neither a flash point nor an ignition point, and thus its operational safety is high, and
(d) that its polarity is low and it does not damage various plastic materials.

Therefore, in order to take the place of this CFC-113, similar characteristics are required. Nowadays, as the hydrochlorofluorocarbon (HCFC), there have been developed hydrochlorofluorocarbons such as 1,1-dichloro-2,2,2-trifluoroethane (hereinafter abbreviated to "HCFC-123"), 1-fluoro-1,1-dichloroethane (hereinafter abbreviated to "HCFC-141b"), 1,1-dichloro-2,2,3,3,3-pentafluoropropane (hereinafter abbreviated to "HCFC-225ca") and 1,3-dichloro-1,1,2,2,3-pentafluoropropane (hereinafter abbreviated to "HCFC-225cb"), and their substitution has been investigated.

However, most of these hydrochlorofluorocarbons have high solubility to various oils and fats but tend to attack substrates, particularly, general-purpose plastics such as acrylic resins and ABS resins, and therefore they are not considered to be all-round substitutes of CFC-113.

In order to satisfy the above-mentioned necessary properties, much attention is paid to perfluoro organic compounds having less chemical attack properties, and various kinds of solvent compositions have been intensively investigated. As a result, the present invention has been attained. That is, the solvent composition which can be used in the present invention contains a non-flammable perfluoro organic compound which has an extremely low polarity and no degreasing ability and which does not damage various substrates at all. In view of requirements of having no flash point, having a high vapor pressure, having a high chemical stability and having a reduced chemical attack to various materials, there can be suitably used perfluoroalkanes, perfluorocycloalkanes, perfluoro ethers, perfluoro cycloethers and the like as the perfluoro organic compounds which are used in the present invention.

Furthermore, the perfluoro organic compounds which can be used in the present invention preferably have a vapor pressure of 30 Torr or more at 250° C.

Typical examples of the perfluoro organic compounds include perfluoropentane ($C_5F_{12}$), perfluorohexane ($C_6F_{14}$), perfluoroheptane ($C_7F_{16}$) perfluorooctane ($C_8F_{18}$), perfluorocyclohexane ($C_6F_{12}$), perfluorocycloheptane ($C_7F_{14}$), perfluoro(alkylcyclohexane) ($C_7F_{14}$ and $C_8F_{16}$) and perfluoro(2-butyltetrahydrofuran) ($C_8F_{16}O$). The content of each of these perfluoro organic compounds is preferably 40% by volume or more based on the volume of the solvent composition of the present invention. When the content of the perfluoro organic compound is less than the above-mentioned amount, a flash point appears, and in the case that the compound is used in the form of a mixture with another flammable organic compound, the chemical attack of the flammable organic compound on products takes place inconveniently.

When the solvent composition of the present invention is used as the above-mentioned degreasing solvent, an organic compound having a degreasing power, particularly a flammable organic compound is added to the solvent composition.

This flammable organic compound having the degreasing power is required (1) to be miscible with the perfluoro organic compound,
(2) to have a suitable dissolving power (the degreasing power) to various soils and oils, and
(3) to have a reduced chemical attack to products (particularly general-purpose plastics).

Examples of the particularly preferable organic compound which can meet the above-mentioned requirements include ether compounds, alkanes and cycloalkanes.

Preferable typical examples of the ether compounds include compounds represented by the formula

wherein $R_1$ is $C_nH_{2n+1}$ or $-Si(CH_3)_3$, $R_2$ is $C_nH_{2n+1}$ or $-Si(CH_3)_3$, and n and m meet $1 \leq n, m \leq 4$, and $2 \leq n+m \leq 6$.

Preferable typical examples of the alkanes and cycloalkanes include compounds represented by the formulae

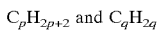

wherein p and q meet $5 \leq p$ and $q \leq 8$.

In order to satisfy the above-mentioned requirements (2) and (3), a particularly preferable embodiment is to use an organic compound having a solubility parameter (an SP value) of 7.5 or less. The SP values can be directly calculated from evaporation latent heat or vapor pressure, but in this specification, literature values mentioned in POLYMER HANDBOOK, 2nd Edition are employed and they are as follows (the values in parentheses were calculated in accordance with an intermolecular attraction constant method of Small). Preferable typical examples of such organic compounds are as follows:

| | |
|---|---|
| n-pentane | SP value = 7.0 |
| | (7.2) |
| n-hexane | SP value = 7.3 |
| | (7.3) |
| 2-methylpentane (isohexane) | SP value = (7.1) |
| 2-methylhexane (isoheptane) | SP value = (7.2) |
| 2,2,4-trimethylpentane (isooctane) | SP value = (6.8) |
| hexamethyldisiloxane ($C_6H_{18}OSi_2$) | SP = (6.0) |
| diethyl ether ($C_4H_{10}O$) | SP = 7.4 (7.3) |
| diisopropyl ether ($C_6H_{14}O$) | SP = 7.0 (6.9) |
| methyl tert-butyl ether ($C_5H_{12}O$) | SP = (7.2). |

Furthermore, the solvent composition of the present invention can be also suitably used as a solvent composition for a water-repellent/oil-repellent agent which can modify the surfaces of substrates, i.e., can protect the substrates from contamination and impart water-repellent/oil-repellent properties to them.

As the solvent for the water-repellent/oil-repellent agent, 1,1,2-trichloro-1,2,2-trifluoroethane (CFC-113) has been overwhelmingly used for the reasons of the solubility of a polymer, safety, stability and the like. As other examples of the solvent, there have been used toluene, ethyl acetate and 1,1,1-trichloroethane, but these solvents tend to damage the substrates to be treated. Therefore, restriction is put on the selection of the substrates. In addition, most of these solvents are flammable, and therefore safety and the like are insufficient.

According to the present invention, there can be provided a non-ODC (Ozone Depletion Chemicals) type all-round water-repellent/oil-repellent composition which is free from a flash point and which is applicable to the various substrates without the restriction, by the use of a solvent composition containing 40% by weight or more of the above-mentioned non-flammable perfluoro organic compound as a solvent component of the water-repellent/oil-repellent composition.

In order to develop the non-ODC type all-round water-repellent/oil-repellent composition of the present invention which is applicable to the surfaces of the various substrates to be treated, a solute and a solvent are required to have the following characteristics.

Solute:
(a) To have a functional group for giving a sufficiently low surface energy, and
(b) to give a sufficient adhesive strength to the various substrates, Solvent:
(a) To have selective solubility only to the solute, and neither to dissolve nor to swell other materials,
(b) to be less toxic, to have neither a flash point nor an ignition point, and thus to have high operational safety, and
(c) to have a high vapor pressure and a high drying rate.

For the purpose of obtaining the water-repellent/oil repellent composition which can meet all of the above-mentioned necessary characteristics, solvent mixtures have been intensively investigated, and as a result, the present invention has been attained.

The solute of the water-repellent/oil repellent composition which is used in the present invention is preferably a fluorine-containing polymer having a long-chain perfluoroalkyl group of $C_6F_{13}$ or more as a functional group, and the polymer preferably contains 40 mole % or more of the fluorine-containing vinyl monomer so as to be highly fluorinated. The perfluoroalkyl group of $C_6F_{13}$ or more as the functional group is particularly excellent in oil-repellency. In addition, also in the case that the polymer contains 40 mole % or more of the fluorine-containing vinyl monomer, the polymer is particularly excellent in oil-repellency. Typical examples of the solute which can be used in the present invention are as follows.

Homopolymer of 2-(perfluorooctyl)ethyl acrylate, homopolymer of (perfluoroheptyl)methyl methacrylate, homopolymer of 2-(N-ethylperfluorooctasulfoamido)ethyl acrylate, 2-(perfluorohexyl)ethyl methacrylate (60 mole %)/methyl methacrylate (30 mole %)/2-hydroxyethyl methacrylate (10 moles) copolymer, 2-(perfluorooctyl)ethyl acrylate (70 moles)/benzyl methacrylate (25 mole %)/2-hydroxyethyl methacrylate (5 mole %) copolymer, and 2-(perfluoroisononyl)ethyl acrylate (50 mole %)/vinyl acetate (30 mole %)/methyl methacrylate (10 mole %)/2-hydroxyethyl methacrylate (10 mole %) 1copolymer.

When it is desired to obtain the uniform and flat film, each of the above-mentioned solutes is preferably used in the range of from 0.01% to 5% by weight, more preferably in the range of from 0.05% to 1% by weight, based on the weight of the total components. A solute concentration of 0.01% by weight or more is particularly preferable in that the film having the sufficient oil-repellency can be formed, and at a solute concentration of 5% by weight or less, the uniform film can be obtained due to the solvation of the solute.

Furthermore, as the solvent composition for dissolving the above-mentioned solute which can be used in the water-repellent/oil-repellent composition of the present invention, a solvent for extinguishing a flash point of the total water-repellent/oil-repellent composition of the present invention and for relieving the damage to the substrate is preferable. In fact, the above-mentioned solvent composition of the present invention is suitable. In addition, usual organic solvents and chlorine-based solvents can be also used together with the solvent composition, depending upon kinds of solute and other additives.

Examples of the solvent which can be used together with the solvent composition of the present invention include fluorine-containing solvents, for example, perfluorocarboxylic acid derivatives such as methyltrifluoro acetate, ethyltrifluoro acetate and butylpentafluoro propionate;

fluorine-based benzene derivatives such as hexafluorobenzene, pentafluorobenzene, benzotrifluoride and bistrifluoromethylbenzene; fluorine-containing alcohols such as trifluoroethanol, pentafluoropropanol and hexafluoroisopropanol; and hydrochlorofluorocarbons such as HCFC-123, HCFC-141b and HCFC-225.

Optional additives can be added to the water-repellent/oil-repellent composition of the present invention, so long as it has no flash point.

The water-repellent/oil-repellent composition of the present invention can be applied by the use of brush coating, immersion, spin coating, roll coating or spray coating.

EXAMPLES

Now, the present invention will be described in detail in reference to examples.

| Example 1 | |
| --- | --- |
| Perfluorohexane | 55 vol % |
| Diisopropyl ether | 45 vol % |
| Example 2 | |
| Perfluoropentane | 50 vol % |
| Diethyl ether | 50 vol % |
| Example 3 | |
| Perfluoroheptane | 60 vol % |
| Diisopropyl ether | 40 vol % |
| Example 4 | |
| Perfluorohexane | 25 vol % |
| Perfluoropentane | 25 vol % |
| Isooctane | 50 vol % |
| Example 5 | |
| Perfluorooctane | 30 vol % |
| Perfluoro(butyltetrahydrofuran) | 20 vol % |
| Isooctane | 50 vol % |
| Example 6 | |
| Perfluorohexane | 60 vol % |
| Methyl tert-butyl ether | 40 vol % |
| Example 7 | |
| Perfluorohexane | 55 vol % |
| Isohexane | 45 vol % |
| Example 8 | |
| Perfluorohexane | 50 vol % |
| Hexamethyldisiloxane | 50 vol % |
| Example 9 | |
| Perfluoropentane | 20 vol % |
| Perfluorohexane | 30 vol % |
| Methyl tert-butyl ether | 25 vol % |
| n-hexane | 25 vol % |
| Example 10 | |
| Perfluoropentane | 20 vol % |
| Perfluorohexane | 20 vol % |
| Diisopropyl ether | 20 vol % |
| Isooctane | 40 vol % |
| Comparative Example 1 | |
| CFC-113 | |
| Comparative Example 2 | |
| CFC-123 | |
| Comparative Example 3 | |
| CFC-141b | |
| Comparative Example 4 | |
| CFC-225ca | 50 vol % |
| CFC-225cb | 50 vol % |
| Comparative Example 5 | |
| Perfluorohexane | 20 vol % |
| Diisopropyl ether | 80 vol % |
| Comparative Example 6 | |
| Perfluorohexane | 30 vol % |
| Diisopropyl ether | 60 vol % |

In Table 1, there are comparably shown characteristics of the mixed solvent compositions in the above-mentioned ratios.

Plastic resistance

In order to confirm that bad influences such as dissolution and swelling to general-purpose plastics were not present, a swelling test was made. Test pieces of the used general plastics were as follows.

| PMMA (acryl) | Delpet 80N (Asahi Chemical Industry Co., Ltd.) |
| --- | --- |
| PC (polycarbonate) | Panlight 1225 (Teijin Chemical Industry Co., Ltd.) |
| ABS (acrylonitrile/butadiene/styrene copolymer) | Saikorak EX120 (Ube Saikon Co., Ltd.) |
| POM (polyacetal) | Juracon M90 (Polyplastic Co., Ltd.) |
| PS (polystyrene) | HT53 (Idemitsu Petrochemicals Co., Ltd.) |
| Urethane rubber | Mirakutran E585 (Nippon Mirakutran Co., Ltd.) |

The test was made by cutting each test material into test pieces having a size of 25×100, immersing them in each solvent composition of the above-mentioned examples and comparative examples for 1 hour, and then calculating weight changes after the immersion. The test pieces having a weight change of less than 0.1% by weight are represented by o, the test pieces of from 0.1% by weight to 1% by weight are represented by Δ, and the test pieces of 1% by weight or more are represented by x.

Flammability

The flammability was measured in accordance with JIS K2265 by the use of a tag sealing type automatic flash point test machine (ATG-4 type; Tanaka Science Instrument Co., Ltd.).

Degreasing Power

As model contaminants, there were selected a cutting oil (MC-W, Idemitsu Kousan Co., Ltd.) and an anticorrosive oil (Polybutene LV-7, Nippon Petrochemicals Co., Ltd.), and 10 μl of each oil were dropped on a slide glass (25×76×1) to prepare contaminated model products. Each model product was immersed in 50 ml of each solvent composition of the examples and the comparative examples, and then washed with at room temperature for 1 minute by means of an ultrasonic washing machine of 28 kHz and 100 W. After the model product was pulled up, a degreasing power was evaluated at a contact angle of pure water on the model product.

Drying time

10 μl of each solvent composition were dropped on a slide glass, and a time which was taken until a weight change was not observed any more was measured.

ODP

Ozone depletion potentials (ozone destruction coefficient).

TABLE 1

|  | Plastic Resistance | | | | | | Flash Point [°C.] | Degreasing Power | | Drying Time [sec] | ODP |
| --- | --- | --- | --- | --- | --- | --- | --- | --- | --- | --- | --- |
|  | PMMA | PC | ABS | POM | PS | Urethane | | MC-W | LV-7 | | |
| Example 1 | ○ | ○ | ○ | ○ | ○ | ○ | None | 38 | 43 | 7 | Absent |
| Example 2 | ○ | ○ | ○ | ○ | ○ | ○ | None | 36 | 41 | -2 | Absent |
| Example 3 | ○ | ○ | ○ | ○ | ○ | ○ | None | 39 | 44 | 19 | Absent |
| Example 4 | ○ | ○ | ○ | ○ | ○ | ○ | None | 36 | 42 | 20 | Absent |
| Example 5 | ○ | ○ | ○ | ○ | ○ | ○ | None | 36 | 41 | 50 | Absent |
| Example 6 | ○ | ○ | ○ | ○ | ○ | ○ | None | 37 | 43 | 7 | Absent |
| Example 7 | ○ | ○ | ○ | ○ | ○ | ○ | None | 35 | 40 | 6 | Absent |
| Example 8 | ○ | ○ | ○ | ○ | ○ | ○ | None | 39 | 45 | 22 | Absent |
| Example 9 | ○ | ○ | ○ | ○ | ○ | ○ | None | 36 | 41 | 7 | Absent |
| Example 10 | ○ | ○ | ○ | ○ | ○ | ○ | None | 35 | 41 | 15 | Absent |
| Comp. Ex. 1 | ○ | ○ | ○ | ○ | ○ | ○ | None | 36 | 41 | 28 | Present |
| Comp. Ex. 2 | x | x | x | x | x | x | None | 35 | 40 | 10 | Present |
| Comp. Ex. 3 | x | x | x | x | x | x | None | 36 | 41 | 10 | Present |
| Comp. Ex. 4 | x | ○ | Δ | ○ | ○ | x | None | 36 | 42 | 31 | Present |
| Comp. Ex. 5 | ○ | ○ | ○ | ○ | ○ | ○ | 10 | 35 | 40 | 7 | Absent |
| Comp. Ex. 6 | ○ | ○ | ○ | ○ | ○ | ○ | 20 | 37 | 41 | 8 | Absent |

Example 11

| | |
|---|---|
| 2-(perfluorooctyl)ethyl acrylate (70 mole%)/benzyl methacrylate (25 mole%)/2-hydroxyethyl methacrylate (5 mole %) copolymer | 0.1% by weight |
| Perfluorohexane | 90% by weight (*) |
| Bistrifluoromethylbenzene | 9.9% by weight |

Note(*): This amount exceeds 40% by volume.

Example 12

| | |
|---|---|
| Homopolymer of 2-(N-ethyl per-fluoro octosulfoamide)ethyl acrylate | 0.25% by weight |
| Perfluoroheptane | 99.75% by weight (*) |

Note(*): This amount exceeds 40% by volume.

Example 13

| | |
|---|---|
| 2-(perfluoroisononyl) ethyl acrylate (50 mole %)/vinyl acetate (30 mole %)/methyl methacrylate (10 mole %)/2-hydroxyethyl methacrylate (10 mole %) copolymer | 1% by weight |
| Perfluorohexane | 50% by weight (*) |
| Perfluoro-2-butyltetrahydrofuran | 40% by weight (*) |
| Pentafluorobenzene | 9% by weight |

Note(*): Sum of these amounts exceeds 40% by volume.

Example 14

| | |
|---|---|
| Homopolymer of (perfluorohexyl)-ethyl acrylate | 0.15% by weight |
| Perfluorohexane | 60% by weight (*) |
| Perfluoroheptane | 20% by weight (*) |
| Perfluorooctane | 10% by weight |
| Benzotrifluoride | 9.85% by weight |

Note(*): Sum of these amounts exceeds 40% by volume.

Example 15

| | |
|---|---|
| (Perfluoroalkyl**) ethyl acrylate (60 mole %)/methyl methacrylate (30 mole %)/hydroxyethylmethacrylate (10 moles) copolymer | 0.3% by weight |

(**The perfluoroalkyl group was a mixture of $C_4F_9$ to $C_{10}F_{21}$, and $C_8F_{17}$ was the main component.)

| | |
|---|---|
| Perfluorooctane | 45% by weight (*) |
| Perfluoro-2-butyltetrahydrofuran | 45% by weight (*) |
| Bistrifluoromethylbenzene | 9.7% by weight |

Note(*): Sum of these amounts exceeds 40% by volume.

Comparative Example 7

| | |
|---|---|
| 2-(perfluorooctyl)ethyl acrylate (70 mole %)/benzyl methacrylate (25 mole %)/2-hydroxyethylmethacrylate (5 mole %) copolymer | 0.1% by weight |
| CFC-113 | 99.9% by weight |

Comparative Example 8

| | |
|---|---|
| 2-(perfluorooctyl)ethyl acrylate (70 mole %)/benzyl methacrylate (25 mole %)/2-hydroxyethylmethacrylate (5 mole %) copolymer | 0.1% by weight |
| CFC-113 | 90% by weight |
| CFC-112 | 9.9% by weight |

Comparative Example 9

| | |
|---|---|
| 2-(perfluoroisononyl)ethyl acrylate (50 mole %)/vinyl acetate (30 mole %)/methyl methacrylate (10 mole %)/2-hydroxyethyl methacrylate (10 mole %) copolymer | 1% by weight |
| HCFC-225 | 99% by weight |

Comparative Example 10

| | |
|---|---|
| 2-(perfluoroisononyl) ethyl acrylate (50 mole %)/vinyl acetate (30 mole %)/methyl methacrylate (10 mole %)/2-hydroxyethyl methacrylate (10 mole %) copolymer | 1% by weight |
| Pentafluoro propanol | 99% by weight |

-continued

Comparative Example 11

| | |
|---|---|
| (Perfluoroalkyl**)ethyl acrylate (60 mole %)/methyl methacrylate (30 mole %)/ hydroxyethyl methacrylate (10 mole %) copolymer (**The perfluoroalkyl group was a mixture of from $C_4F_9$ to $C_{10}F_{21}$, and $C_8F_{17}$ was the main component.) | 0.3% by weight |
| Ethyltrifluoro acetate | 60% by weight |
| Perfluorohexane | 39.7% by weight (*) |

Note(*): This amount does not exceed 40% by volume.

Comparative Example 12

| | |
|---|---|
| (Perfluoroalkyl**)ethyl acrylate (60 mole %)/methyl methacrylate (30 mole %)/ hydroxyethyl methacrylate (10 mole %) copolymer (**The perfluoroalkyl group was a mixture of from $C_4F_9$ to $C_{10}F_{21}$, and $C_8F_{17}$ was the main component.) | 0.3% by weight |
| HCFC-123 | 50% by weight |
| HCFC-141b | 49.7% by weight |

E585 (Nippon Mirakutran Co., Ltd.) and natural rubber. Each substrate having a size of 25×100×3 was immersed in each oil-repellent composition for 1 hour, and weight changes after the immersion were then calculated. The substrates having a weight change of less than 0.1% by weight are represented by o, the substrates of from 0.1% by weight to 1% by weight are represented by Δ, and the substrates of 1% by weight or more are represented by x.

Flammability

The flammability was measured in accordance with JIS K2265 by the use of a tag sealing type automatic flash point test machine (ATG-4 type: Tanaka Science Instrument Co., Ltd.).

Drying time 10 μl of each solvent composition were dropped on a slide glass, and a time which was taken until weight change was not observed any more was measured.

TABLE 2

| | Plastic Resistance | | | | | | Oil-Repellency [°C.] | Water-Repellency [°C.] | Flash Point [°C.] | Drying Time [sec] | ODP *1 |
|---|---|---|---|---|---|---|---|---|---|---|---|
| | Acryl | PC | ABS | POM | Rubber A | Rubber B | | | | | |
| Example 11 | o | o | o | o | o | o | 78 | 119 | None | 20 | Absent |
| Example 12 | o | o | o | o | o | o | 72 | 116 | None | 50 | Absent |
| Example 13 | o | o | o | o | o | o | 74 | 116 | None | 25 | Absent |
| Example 14 | o | o | o | o | o | o | 69 | 116 | None | 25 | Absent |
| Example 15 | o | o | o | o | o | o | 75 | 117 | None | 30 | Absent |
| Comp. Ex. 7 | o | o | o | Δ | Δ | x | 77 | 118 | None | 28 | Present |
| Comp. Ex. 8 | o | o | o | Δ | Δ | x | 77 | 117 | None | 30 | Present |
| Comp. Ex. 9 | x | o | o | o | x | Δ | 74 | 116 | None | 31 | Absent |
| Comp. Ex. 10 | x | x | x | o | Δ | Δ | 73 | 115 | None | 90 | Absent |
| Comp. Ex. 11 | Δ | Δ | Δ | Δ | Δ | Δ | 72 | 116 | 25 | 75 | Absent |
| Comp. Ex. 12 | x | x | x | x | x | x | 73 | 116 | None | 10 | Present |

Rubber A: Urethane rubber
Rubber B: Natural rubber
*1: ODP: Ozone depletion potentials (ozone destruction coefficient)

In Table 2, there are comparably shown characteristics of the oil-repellent compositions in the above-mentioned ratios.

Evaluation of oil-repellency

Each oil-repellent composition was applied onto an acrylic substrate (Delpet 80N; Asahi Chemical Industry Co., Ltd.), and the oil-repellency was then evaluated at a contact angle by hexadecane.

Plastic resistance

In order to confirm that bad influences such as dissolution and swelling to general-purpose plastics were not present, a swelling test was made. As substrate materials to be used, there were selected PMMA (acryl), Delpet 80N (Asahi Chemical Industry Co., Ltd.), PC (polycarbonate), Panlight 1225 (Teijin Chemical Industry Co., Ltd.), ABS (acrylonitrile/butadiene/styrene copolymer), Saikorak EX120 (Ube Saikon Co., Ltd.), POM (polyacetal), Juracon M90 (Polyplastic Co., Ltd.), Urethane rubber, Mirakutran

What is claimed is:

1. A method for modifying a surface of a substrate comprising: applying to the substrate a non-flammable water-repellent/oil repellent composition consisting essentially of a 0.01 to 5.0% by weight of fluorine-containing polymer and a solvent composition comprising a non-flammable perfluoro organic compound in an amount of not less than 40% by weight, thereby forming a film consisting of fluorine-containing polymer on the surface of the substrate.

2. The method according to claim 1, wherein said perfluoro organic compound is a compound having a vapor pressure of 30 Torr or more at 25° C.

3. The method according to claim 1, wherein said fluorine-containing polymer contains 40 mole % or more of a monomer of a fluorine-containing vinyl compound selected from the group consisting of fluoroalkyl acrylate, fluoroalkyl methacrylate and fluoroalkyl vinyl ether.

4. The method according to claim 1, wherein said fluorine-containing polymer is a polymer which comprises a monomer containing a perfluoroalkyl group having a molecular weight more than $C_8F_{13}$.

5. The method according to claim 1, wherein said perfluoro organic compound is at least one selected from the group consisting of perfluoroalkanes, perfluorocycloalkanes and perfluoro cyclic ethers.

6. The method according to claim 5, wherein said perfluoroalkanes and perfluorocycloalkanes are selected from the group consisting of $C_5F_{12}$, $C_6F_{14}$, $C_7F_{16}$, $C_8F_{18}$, $C_6F_{12}$, $C_7F_{14}$ and $C_8F_{16}$.

7. The method according to claim 5, wherein said perfluoro cyclic ethers are selected from the group consisting of $C_6F_{12}O$, $C_7F_{14}O$ and $C_8F_{16}O$.

* * * * *

UNITED STATES PATENT AND TRADEMARK OFFICE
CERTIFICATE OF CORRECTION

PATENT NO.  : 5,954,990
DATED       : September 21, 1999
INVENTOR(S) : HIROHIDE MATSUHISA ET AL.

It is certified that error appears in the above-identified patent and that said Letters Patent is hereby corrected as shown below:

COLUMN 2

Line 8, "this" should be deleted; and
Line 40, "250°C" should read --25°C.--.

COLUMN 3

Line 8, "$C_nH_{2n+1}$" (second occurrence) should read --$C_mH_{2m+1}$--.

COLUMN 4

Line 41, "1copolymer." should read --copolymer.--.

Signed and Sealed this

Eighteenth Day of July, 2000

Attest:

Q. TODD DICKINSON

Attesting Officer

Director of Patents and Trademarks